Patented Dec. 13, 1927.

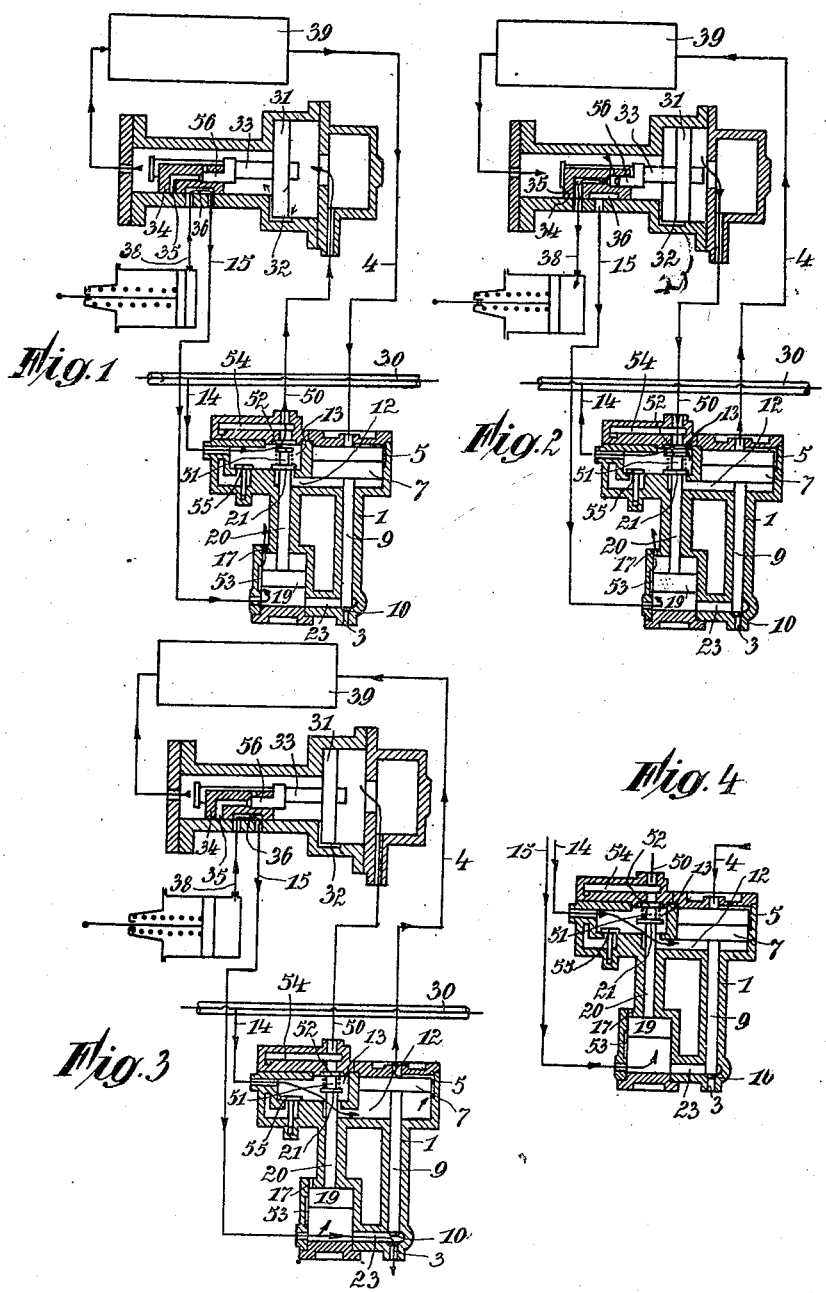

1,652,876

UNITED STATES PATENT OFFICE.

JOHANN RIHOSEK, OF VIENNA, AND RICHARD LUDWIG LEUCHTER, OF WEIDLINGAU-HADERSDORF, AUSTRIA, ASSIGNORS OF ONE-HALF TO THE FIRM GEBRÜDER HARDY, MASCHINENFABRIK UND GIESSEREI AKTIEN GESELLSCHAFT, OF VIENNA, AUSTRIA.

APPARATUS FOR RELEASING STEP-BY-STEP SINGLE-CHAMBER AIR-PRESSURE BRAKES.

Application filed April 14, 1927, Serial No. 183,855, and in Austria May 19, 1926.

Our invention relates to an apparatus for releasing step by step single chamber air pressure brakes.

The object of our invention is to provide an apparatus of this class which, while very sensitive even to slight release impulses in the train pipe, yet is simple in construction and reliable in operation.

With these and other objects, hereinafter more fully apparent, our invention consists essentially in that into a duct connecting the train pipe with one end of the brake control valve casing, a brake releasing control valve is interposed. By this arrangement even a very slight increase of the pressure in the train pipe will cause the brake control valve to bring about a release of the brakes as the air wave, propagating along the train pipe and constituting a brake release impulse, need not be divided to act on the brake control valve and on the brake release control valve simultaneously.

In the annexed drawing we have diagrammatically shown by way of example an embodiment of our improved apparatus in different positions of the parts.

Fig. 1 shows the parts in the normal running position.

Fig. 2 shows the parts in the position which they occupy when the brakes are being applied.

Fig. 3 shows the parts in the position, which they occupy when the brakes are being released and Fig. 4 shows the parts in the position, which they occupy when the brakes are being applied again after having been partially released.

The brake control valve 34 is slidably mounted in a casing and is provided with a passage 35 and a recess 36 the latter two being adapted to co-operate with two ports provided in the slide seat of such valve. One of the ports is permanently connected by a pipe 38 to the air pressure space of the brake cylinder and the other of these ports is permanently connected by a pipe 15 to the chamber 23 of the exhaust valve 10 mounted on a rod 9 and controlling the exhaust opening 3. The rod 9 carries a piston 7 working in a cylinder in the casing 1.

The chamber 13 of the brake releasing control valve 21 is permanently connected to the train pipe 30 by a pipe 14. This valve is mounted on one end of the rod 20, the other end of which carries a piston 19 working in a cylindrical enlargement of the chamber 23 of the exhaust valve 10. A groove 53 in the wall of the said cylindrical enlargement establishes communication between the two sides of the piston 19 when the brake releasing control valve 21 is in its normal position, shown in Fig. 1. A valve 52 is supported by means of a light spring 51 on the rod 20 above the valve 21 and controls the communication between the valve chamber 13 and a pipe 50 leading to one end of the brake control valve casing. The brake releasing control valve 21 controls the communication between the chamber 13 and the chamber 12 on one side of the piston 7. A groove 5 in the cylinder of the piston 7 is adapted to establish communication between the two sides of the piston 7 and a pipe 4 leading to the auxiliary reservoir 39. The slide valve 34 is mounted on the rod 33 of its actuating piston 31 with a slight longitudinal play, a supplemental valve 56 being rigidly mounted on the rod 33, which valve controls the communication between the passage 35 of the slide valve 34 and the interior of its casing.

For securing an unobjectionable operation of the valves 21, 52, bye passage 54 may be provided in the casing, such passage connecting the bore to which the pipe 50 is connected with the chamber 13, a nonreturn valve 55 closing the end of this passage 54.

In the normal or running position shown in Fig. 1 there is the same pressure in the train pipe 30, the auxiliary reservoir 39, the chamber 13 and above the piston 7.

The valves 21 and 10 are closed while the valve 52 is open. The brake cylinder is in communication with the atmosphere through pipe 38, slide valve 34, passage 36, pipe 15, groove 53 and bore 17.

If a braking step has to be initiated, the pressure in the train pipe is reduced whereby the parts come into the position shown in Fig. 2. The slide valve 34 of the brake control valve then connects the brake cylinder with the auxiliary reservoir in which the passage 35 of the slide valve 34 comes opposite the part connected to the pipe 38 and is connected with the left side space of the brake control casing, which communicates with the auxiliary reservoir 39 as above stated. This connection is established by the supplementary valve 56 fast on the rod 33 of the piston 31 and movable longitudinally in the slide valve to a limited extent. The valve controls a port in the passage 35 and a port in the slide valve body, all as is well known and seen from Fig. 2. Air under pressure rushes from this auxiliary reservoir into the brake cylinder whereby the pressure in the auxiliary reservoir is reduced and the brakes are applied.

Assuming now that the reduction of the pressure in the train pipe was so slight, that by the reduction of the pressure in the auxiliary reservoir due to the charging of the brake cylinder the pressure may be greater than that in the train pipe, then after a short time, the train pipe pressure will exceed that in the auxiliary reservoir and the piston 31 will move from the position shown in Fig. 2 slightly to the left until the supplemental valve 56 shuts off the inflow of air from the auxiliary reservoir into the passage 35 and the brake cylinder, while the slide valve 34 remains stationary in its position shown in Fig. 2, the slight force exerted on the piston 31, at the first moment of its movement to the left not being sufficient to overcome the friction of the slide valve on its seat, as is well known. The positions of the auxiliary valve and of the brake releasing control valve are not changed, only a reduction of pressure has taken place in the chamber 13 of the auxiliary valve and in the space above the piston 7 of the brake releasing control valve.

If, however, the reduction of pressure in the train pipe is greater than that which can result in the auxiliary reservoir from full charging the brake cylinder with the air under pressure from the auxiliary reservoir, the brakes will be fully applied as in the case of emergency application of the brakes. Thus the force with which the brakes are applied, may be governed at will and the brakes may be applied in a plurality of successive steps with gradually increasing force as is well known.

If after the application of the brakes a brake releasing step has to be initiated, the pressure in the train pipe is increased whereby the parts are brought into the position shown in Fig. 3. The increase of pressure propagates through the pipe 14 to the chamber 13 and thence through the pipe 50 to the brake control valve, which moves into the release position. In this position, shown in Fig. 3, the brake cylinder is connected by means of the slide valve of the brake control valve and the pipe 15 with the space below the piston 19, which is caused to rise by the excess of pressure whereby the valve 52 is closed and the valve 21 is opened. Thereby the connection with the brake control valve is interrupted and the groove 53 and the opening 17 are closed by the piston 19.

The train pipe pressure may then act on the bottom side of the piston 7, the latter rises and opens the valve 10 so that the air under pressure may escape from the brake cylinder as indicated by the arrow heads in Fig. 3. At the same time the piston 7 has uncovered the groove 5 so that the air under pressure may flow from the train pipe into the auxiliary reservoir for equalizing the pressures in the two.

When the pressures have equalized on both sides of the piston 7, the excess of pressure, due to the difference of areas on the two sides of the piston, becomes operative, this piston moves downwards into the position shown in Fig. 4 and closes the valve 10, the valves 21 and 52 not changing their positions. The releasing step has thus come to an end and in case of a further increase of pressure in the train pipe, the same operation is repeated.

Thus the brake cylinder pressure may be reduced step by step in fine graduations. If the air pressure in the brake cylinder has thus been reduced to a predetermined extent, the train pipe pressure acting on the top side of the valve 21, forces the piston rod 20 and the piston downwards into the normal position shown in Fig. 1. If the train pipe pressure is increased so far that the equalization of the same with the pressure in the auxiliary reservoir takes place only after the pressure in the brake cylinder has sunk below the above said predetermined limit, the parts are directly returned from the position shown in Fig. 3 to the position shown in Fig. 1, as is well known.

If after a releasing step a brake application step has to be initiated, the pressure in the train pipe is reduced, the parts occupying the position shown in Fig. 4, whereby also the pressure in the chamber 13 is reduced. Owing to the excess of pressure on its top side the valve 52 is opened and the reduction of pressure propagates to the brake control valve which results in shifting the brake control valve piston 31 to the position shown in Fig. 2, and in carrying into effect a brake applying step as above described with reference to Fig. 2.

As in this brake application step the piston 31 is moved to the right, the pressure on the right hand side of this piston is increased, which might result in an unintentional opening of the valve 52. This is prevented by the bye passage 54 and the nonreturn valve 55 whereby the pressures on both sides of the valve 54 are equalized, so that the latter does not open.

What we claim is:

1. In an apparatus for releasing step by step single chamber air pressure brakes, the combination of a brake cylinder, an auxiliary reservoir, a brake control slide valve, a casing for the latter comprising a slide valve seat provided with two ports adapted to cooperate with passages in the said brake control slide valve, a piston actuating such brake control slide valve and adapted to work in the said casing, a permanently open connection between the auxiliary reservoir and one end of the brake control valve casing, a train pipe, a brake releasing control valve, a casing therefor, comprising a chamber for such brake releasing control valve, a permanently open connection between this chamber and the said train pipe, a connection between such chamber and the other end of the brake control valve casing, whereby the latter and the brake releasing control valve chamber are connected in series, an exhaust valve and an exhaust valve casing comprising a chamber, an opening in such casing cooperating with such exhaust valve and an enlargement, a piston adapted to work in such enlargement, a rod connecting such piston to the brake releasing control valve, means controlled by such piston for connecting the chambers on both sides of the last named piston with each other and with the atmosphere, a rod carrying the said exhaust valve and a piston, a passage controlled by the said brake releasing control valve and connecting the chamber of such brake releasing control valve with the space on one side of the piston, a permanently open connection between the chamber on the other side of the piston and the auxiliary reservoir, means controlled by the last named piston for establishing a communication between the chambers on both sides of the last named piston, a brake cylinder comprising an air pressure space, a permanently open connection between one of the ports in the said brake control slide valve and the said air pressure space of the brake cylinder and a permanently open connection between the other port in the brake control valve and the said exhaust valve chamber.

2. In an apparatus for releasing step by step single chamber air pressure brakes, the combination of a brake cylinder, an auxiliary reservoir, a brake control slide valve, a casing for the latter comprising a slide valve seat provided with two ports adapted to cooperate with passages in the said brake control slide valve, a piston for actuating such brake control slide valve and adapted to work in the said casing, a permanently open connection between the auxiliary reservoir and one end of the brake control valve casing, a train pipe, a brake releasing control valve, a casing therefor, comprising a chamber for such brake releasing control valve, a permanently open connection between this chamber and the said train pipe, a connection between such chamber and the other end of the brake control valve casing, whereby the latter and the brake releasing control valve chamber are connected in series, an exhaust valve and an exhaust valve casing comprising a chamber, an opening in such casing cooperating with such exhaust valve and an enlargement, a piston adapted to work in such enlargement, a rod connecting such piston to the brake releasing control valve, a spring supported valve mounted on the end of such rod opposite to the said piston, a seat for such spring supported valve provided in the said connection between the chamber of the brake releasing control valve and the other end of the brake control valve casing, means controlled by such piston for connecting the chambers on both sides of the last named piston with each other and with the atmosphere, a rod carrying the said exhaust valve and a piston, a passage controlled by the said brake releasing control valve and connecting the chamber of such brake releasing control valve with the space on one side of the piston, a permanently open connection between the chamber on the other side of the piston and the auxiliary reservoir, means controlled by the last named piston for establishing a communication between the chambers on both sides of the last named piston, a brake cylinder comprising an air pressure space, a permanently open connection between one of the ports in the said brake control valve and the said air pressure space of the brake cylinder and a permanently open connection between the other port in the brake control valve and the said exhaust valve chamber.

3. In an apparatus for releasing step by step single chamber air pressure brakes, the combination of a brake cylinder, an auxiliary reservoir, a brake control slide valve, a casing for the latter comprising a slide valve seat provided with two ports adapted to cooperate with passages in the said brake control slide valve, a piston for actuating such brake control slide valve and adapted to work in the said casing, a permanently open connection between the auxiliary reservoir and one end of the brake control valve casing, a train pipe, a brake releasing control valve, a casing therefor comprising a chamber for such brake releasing control valve, a permanently open connection between this chamber and the said train pipe, a connection between such chamber and the other end of the brake control valve casing, whereby the latter and the brake releasing control valve chamber are connected in series, an exhaust valve and an exhaust valve casing comprising a chamber, an opening in such casing cooperating with such exhaust valve and an enlargement, a piston adapted to work in such enlargement, a rod connecting such piston to the brake releasing control valve, a spring supported valve mounted on the end of such rod opposite to the said piston, a seat for such spring supported valve provided in the said connection between the chamber of the brake releasing control valve and the other end of the brake control valve casing, a bye passage connecting with each other the spaces on the opposite sides of the spring supported valve, a nonreturn valve in such bye passage adapted to automatically establish a connection of the said two spaces whenever the pressure in the said other end of the brake control valve casing exceeds that in the auxiliary reservoir, means controlled by such piston for connecting the chambers on both sides of the last named piston with each other and with the atmosphere, a rod carrying the said exhaust valve and a piston, a passage controlled by the said brake releasing control valve and connecting the chamber of such brake releasing control valve with the space on one side of the piston, a permanently open connection between the chamber on the other side of the piston and the auxiliary reservoir, means controlled by the last named piston for establishing a communication between the chambers on both sides of the last named piston, a brake cylinder comprising an air pressure space, a permanently open connection between one of the ports in the said brake control slide valve and the said air pressure space of the brake cylinder and a permanently open connection between the other port in the brake control valve and the said exhaust valve chamber.

In testimony whereof we have affixed our signatures.

JOHANN RIHOSEK.
RICHARD LUDWIG LEUCHTER.